No. 739,146.

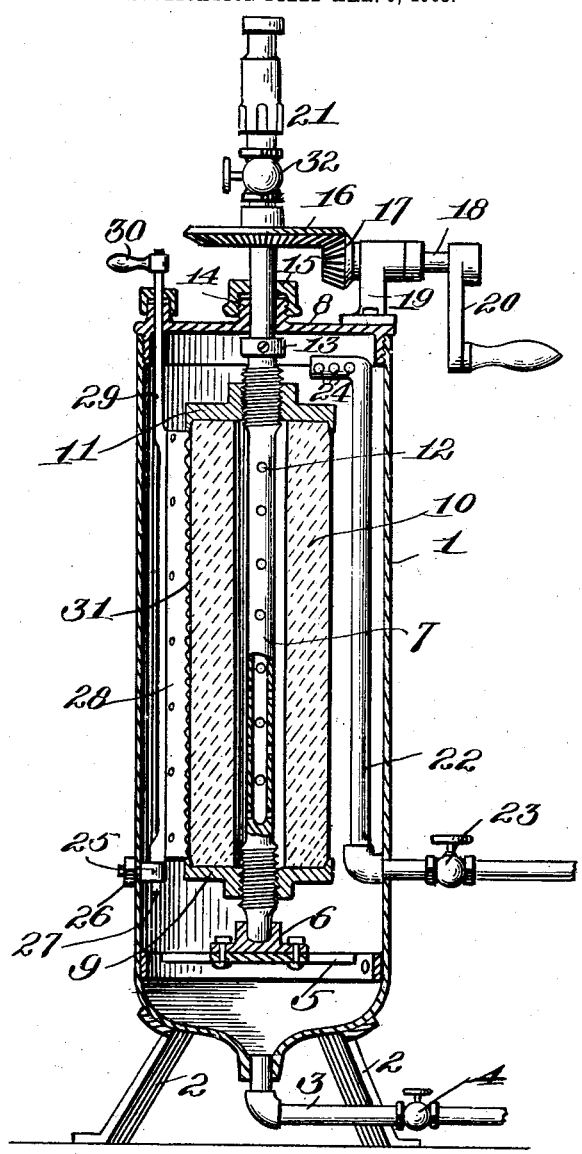

Patented September 15, 1903.

UNITED STATES PATENT OFFICE.

FREDERICK BOMMARIUS, OF NEW ORLEANS, LOUISIANA.

FILTER.

SPECIFICATION forming part of Letters Patent No. 739,146, dated September 15, 1903.

Application filed March 9, 1903. Serial No. 146,959. (No model.)

*To all whom it may concern:*

Be it known that I, FREDERICK BOMMARIUS, a citizen of the United States, residing at New Orleans, in the parish of Orleans and State of Louisiana, have invented certain new and useful Improvements in Filters, of which the following is a specification.

This invention relates to filters of the kind described in United States Patent No. 639,140, granted to me December 12, 1899.

The object of the invention is to provide improved means for cleaning the circular porous filtering-wall when said wall becomes fouled or clogged. To attain this object, I provide an eccentrically-mounted scraper which by means of a suitable handle is adapted to be placed in contact with the outer periphery of the porous filtering-wall, said filtering-wall being then rotated by any suitable means.

In the accompanying drawing, forming a part of this specification, the figure is a vertical section of my apparatus, showing the position of the scraper.

The reference-numeral 1 indicates a cylindrical casing which is supported by braces 2. At its lower end the casing 1 is contracted, as shown, and terminates in a pipe 3, which is provided for the exit of mud or other sediment from the casing 1. The pipe 3 is provided with a controlling-valve 4. Arranged transversely in the casing 1, above the contracted portion thereof, is a plurality of cross-pieces 5, which support at their center or intersecting portions a bearing-plate 6. Stepped in the bearing-plate 6 is a hollow shaft 7, which extends through the head 8 of the casing 1. The upper and lower portions of the shaft 7 are screw-threaded, as shown. Upon the lower screw-threads of the shaft 7 is screwed a cap 9, which supports a porous filtering-tube 10. A cap 11, similar to the cap 9, is screwed upon the upper screw-threads of the shaft 7 and firmly retains in position the uppper end of the porous filtering-tube 10. The shaft 7, between the caps 9 and 11 thereon and within the porous filtering-tube, is provided with a plurality of perforations 12.

Below the head 8 of the casing 1 the shaft 7 is provided with a suitable adjustable stop 13, which is provided for preventing said shaft becoming displaced from the bearing-plate 6. A packing-tube 14, screw-threaded at its upper end for the reception of the cap 15, is attached to the head 8 of the casing 1 and receives the upper end of the shaft 7. Suitable packing may be provided beneath the cap 15 and within the tube 14 to produce a tight joint between the tube 14 and the shaft 7. At its upper end the shaft 7 is provided with a beveled wheel 16, meshing with a beveled wheel 17 on a horizontal shaft 18, supported by an upright 19 on the head 8 of the casing 1. The horizontal shaft 18 is operated by a crank 20 when it is desired to rotate the porous filtering-tube 10.

An expansion-joint 21 is fitted over the upper end of the hollow shaft 7 and connects said shaft with any suitable reservoir or storage-tank for filtered water. (Not shown.) Below the expansion-joint 21 the hollow shaft 7 is provided with a controlling-valve 32.

A pipe 22, provided with a controlling-valve 23, leads into the lower end of the casing 1 and extends upward to the upper portion thereof, where it terminates, the upper end thereof being closed. A plurality of perforations 24 is provided in the upper end of the pipe 22 to permit the passage of the liquid through said pipe. The perforations 24 are provided to form a sieve, which prevents the entrance of large foreign bodies into the casing 1. The lower end of the pipe 22 is connected with a water-main or other source of supply, from which the liquid to be filtered is drawn.

In the lower portion of the casing 1, extending through the wall thereof, is an eyebolt 25, provided on its outer end with a screw-nut 26. The eyebolt 25 provides a bearing-point for the lower end 27 of an eccentrically-mounted scraper 28. The upper end 29 of the scraper 28 extends through the head 8 of the casing 1 and is provided with a handle 30, by means of which the position of said scraper may be adjusted. Along its inner edge the scraper 28 is provided with a plurality of brushes or teeth 31, which are adapted to bear against the outer periphery of the porous filtering-tube 10 and effectually clean said tube. Any suitable material may be attached to the scraper 28 for cleaning the cylinder 10.

Constructed as above described the operation of my device is as follows: Let it be assumed that all the valves of the apparatus are closed. The valve 23 in the inlet-pipe 22 is opened, and a quantity of water to be filtered is permitted to enter the casing 1 by the perforations 24 of the pipe 22. This water filters or percolates through the porous tube 10, as will be readily understood. The valve 32 in the hollow shaft 7 is then opened, and the supply of filtered water contained within the porous tube 10 is permitted to pass into any suitable storage-reservoir. When the apparatus becomes clogged or fouled by use and it is desired to clean the same, the valve 23 in the supply-pipe 22 is closed and the valve 4 in the waste-pipe 3 at the bottom of the casing 1 is opened. By means of the expansion-joint 21 the shaft 7 may be disconnected or not from the storage-reservoir above mentioned and may be connected with any suitable water-main or source of supply. Either way water is then permitted to back down the shaft 7 and percolate outwardly or in a reverse direction through the porous tube 10. The handle 30 of the scraper 28 is now operated to place the cleaning edge of said scraper against the outer periphery of the porous tube 10, and said tube 10 is rotated through the crank 20 and beveled wheels 16 and 17. The rotation of the tube 10 causes the scraper 28 to effectually clean the tube 10, which cleaning action is facilitated by the water percolating reversely through said tube. The sediment and impurities which are removed from the cylinder or porous tube 10 settle into the lower end of the casing 1 and are drawn off through the waste-pipe 3, as will be readily understood. If desired, I may mount a plurality of scrapers adjacent to the periphery of the porous tube 10 in the manner described. By mounting the scraper 28 eccentrically and providing it with a handle 30 I am enabled to fold said scraper closely against the inner periphery of the casing 1, so as to occupy but little space and not interfere with the filtering action of the tube 10.

Having thus described my invention, what I claim as new, and desire to secure by Letters Patent, is—

A filter composed of a casing, having an inlet and an outlet, a perforated shaft supported at its lower end in said casing, its upper end passing through the upper end of said casing, and connecting with an expansion-joint, said perforated shaft having screw-threads adjacent to its lower end, and on its upper end adjacent to and beneath the upper cover of said casing, a porous filtering-wall surrounding said perforated shaft, caps engaged with said perforated shaft and pressing on the ends of the porous filtering-wall to hold it in position, a set-collar on said perforated shaft located beneath the top cover of the filter-casing to prevent the dislodgment of said perforated shaft, a free-moving scraper resting at its lower end in a fixed support attached to the casing, said scraper having an offset above and adjacent to said support and at its top end having an offset beneath the top of said filter-casing and then passing through the top wall of the filter-casing, the scraper having a tooth-shaped edge located between the upper and lower offset thereof, means for rotating said perforated shaft, and the porous filtering-wall, and a handle on the upper end of the scraper for engaging and disengaging the toothed edge of said scraper with the porous wall.

In testimony whereof I affix my signature in presence of two witnesses.

FREDERICK BOMMARIUS.

Witnesses:
W. H. COOK,
FRED. C. COOK.